US010583807B2

(12) United States Patent
Nicotra

(10) Patent No.: US 10,583,807 B2
(45) Date of Patent: Mar. 10, 2020

(54) WATCH WITH FOB CAPABILITIES

(71) Applicant: Alyssa Nicotra, Jamesville, NY (US)

(72) Inventor: Alyssa Nicotra, Jamesville, NY (US)

( * ) Notice: Subject to any disclaimer, the term of this patent is extended or adjusted under 35 U.S.C. 154(b) by 0 days.

(21) Appl. No.: 16/213,032

(22) Filed: Dec. 7, 2018

(65) Prior Publication Data

US 2019/0176756 A1  Jun. 13, 2019

Related U.S. Application Data

(60) Provisional application No. 62/595,843, filed on Dec. 7, 2017, provisional application No. 62/722,223, filed on Aug. 24, 2018.

(51) Int. Cl.

| | |
|---|---|
| *G07C 9/00* | (2006.01) |
| *B60R 25/24* | (2013.01) |
| *B60R 25/20* | (2013.01) |
| *G04B 47/04* | (2006.01) |
| *G04G 21/04* | (2013.01) |
| *G04C 21/04* | (2006.01) |

(52) U.S. Cl.
CPC ............ *B60R 25/24* (2013.01); *B60R 25/209* (2013.01); *G04B 47/04* (2013.01); *G04C 21/04* (2013.01); *G04G 21/04* (2013.01); *G07C 9/00896* (2013.01); *G07C 9/00904* (2013.01); *B60R 2325/20* (2013.01); *G07C 2009/00984* (2013.01)

(58) Field of Classification Search
None
See application file for complete search history.

(56) References Cited

U.S. PATENT DOCUMENTS 8,994,827 B2 * 3/2015 Mistry ................. G06F 3/0304
                                                        348/158

* cited by examiner

*Primary Examiner* — K. Wong
(74) *Attorney, Agent, or Firm* — Greg N. Geiser; Gutwein Law

(57) ABSTRACT

Described herein is a watch with a plurality of electrical components and systems to generally provide a remote coupling with an additional system, such as a vehicle or entry system. The watch generally functions as a vehicle fob and security device for wearing by a user. The watch includes a bezel portion having a generally hollow channel configured for the receipt of airflow to generally direct the airflow to form a sound, wherein the bezel can be utilized as a whistle.

19 Claims, 9 Drawing Sheets

WATCH WITH FOB CAPABILITIES

CROSS REFERENCE TO RELATED APPLICATIONS

This application claims priority to U.S. Provisional Patent Application No. 62/595,843 filed 7 Dec. 2017 and U.S. Provisional Patent Application No. 62/722,223 filed 24 Aug. 2018 to the above-named inventor, and is herein incorporated by reference in their entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The invention relates generally to a watch configured with capabilities for use as a fob with a vehicles and entry doors including additional features.

BACKGROUND

Generally, within the prior art, a fob is an accessory carried by a user and including various electronics in a wireless and remote coupling with a secured system, such as a vehicle security system or lock for an entryway. Accordingly, a user is able to utilize the fob to lock and unlock these secured systems and operate various features from a remote location. A typical fob is placed on a key ring or integrated with a key and includes buttons to generally allow a user to lock a vehicle, unlock a vehicle, operate a vehicle alarm, open the vehicle doors, and start a vehicle. More recently fobs have been utilized to operate systems in addition to vehicle systems, such as entry way doors and secured doors.

Prior art fobs as disclosed generally include a plurality of electronic components to enable remote communication with various systems enclosed within a housing and coupled to a button or mechanism to enable operation of the fob. Most generically, the fobs include a controller configured to a generate a signal and coupled to a transceiver for broadcasting the signal to the various systems. Generally, these traditional fobs fail to meet the needs of the market as they are potentially and easily lost or stolen.

Additional improvements within the prior art relate to fobs that generally allow for passive use through proximity sensors, wherein proximity of the fob adjacent to a co-operating system, such as a door lock or vehicle, is capable of altering a status of the co-operating system. Although these proximity fobs are generally helpful, they do require a user to carry an additional fob device on their person. Further improvements also relate to secured mechanism in the form of a personal electronic device, such as a cellular telephone, coupled to the various vehicle and security systems for manipulation by a user.

When compared to a traditional key, the electronics of the fob and additional electronic devices enables a user easier access and manipulation of the various vehicle and security systems.

Recently, within the prior art technological advances have enabled the use of these electronic components in smaller objects, such as a wristwatch. In particular, U.S. Pat. No. 7,068,151 to Giles et al. discloses a watch having a display screen with a keypad and various buttons to enable the operation of various vehicle features including the security features of the vehicle. Although this '151 reference is generally useful, it is lacking additional features to provide personal security to a wearer.

Therefore, there is a need within the market for an improved watch with fob capabilities and having additional safety features to provide additional use to a user.

SUMMARY OF THE INVENTION

It would be advantageous to have an improved watch device configured to be worn on a user's wrist and having features configured for a communicative and remote coupling with a plurality of vehicle and entry systems. Accordingly, the device generally resembles a watch including an assembly functioning as a timepiece and including a strap configured to secure the device to the wrist of the user.

The device communicative and remote coupling is provided from a plurality of electronic components received within a housing of the device and generally configured for use as a vehicle fob and including additional sensors, such as, but not limited to, a proximity sensor. The device housing includes a plurality of buttons coupled to the plurality of electronic components and configured to operate the security and ignition systems of the vehicle in remote coupling or an entry way security device in remote coupling with the device.

The housing generally encloses the timepiece mechanisms of the device and including a dial portion. The dial portion generally a planar surface and including a plurality of indicators to aid a user in telling a time. The dial portion configured for illumination, wherein the dial portion is configured of a material and surface that generates a light. Preferably, the dial portion is of the electroluminescent type, wherein an electrical field or current is converted into light.

As an added security feature, the activation of the electroluminescent dial is configured to emit light in a specific pattern upon direction by a user. Accordingly, the user may illuminate the dial in a pattern to indicate an emergency condition or to indicate the need for a wearer to be rescued. Preferably, the dial is configured to illuminate in a staccato-like pattern resembling the visual representation of the Morse Code pattern for S.O.S in the form of a sequence of three short flashes followed by three long flashes followed by three short flashes to mimic the dot, dot, dot, dash, dash, dash, dot, dot, dot code sequence.

In an alternate embodiment of the device, the housing upper surface includes a bezel surrounding the dial portion of the device. The bezel having a channel generally surrounding the dial and shaped to direct air between a first opening and a second opening and configured to generate a sound. The first opening providing an inlet into the channel allowing a user to blow air into the channel that is then directed around the channel towards the second opening functioning as an outlet for the directed air. The second opening generally causing turbulence of air directed into the channel and out through the second opening, wherein the turbulence causes a whistle sound to be generated. Accordingly, a user can utilize the device as an emergency whistle to alert others to their presence.

In the preferred embodiments and assembly of the device, the device is constructed out of resilient materials assembled to provide a generally sealed structure to prevent the infiltration of debris and water into the interior of the device.

Accordingly, the device assembly may include pushers or buttons that have a gasket assembly to allow for flexibility and to generally protect the internal components of the device.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
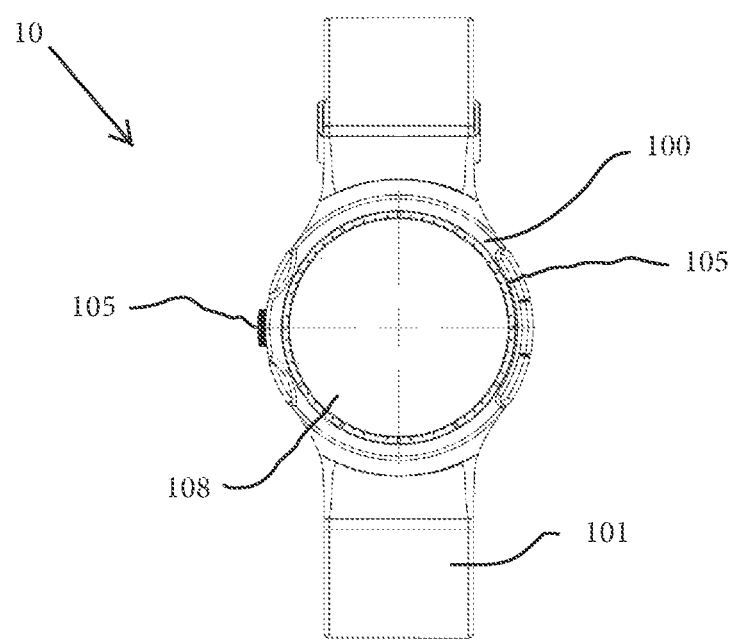
FIG. 1 shows the top of device, according to the present disclosure.

The following detailed description includes references to the accompanying drawing, which forms a part of the detailed description. The drawing shows, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS., with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The device of the present disclosure is most generally directed to a watch having various communicative features for remote coupling to vehicle and security systems and including features to provide personal security to a wearer of the watch.

Figure 2:
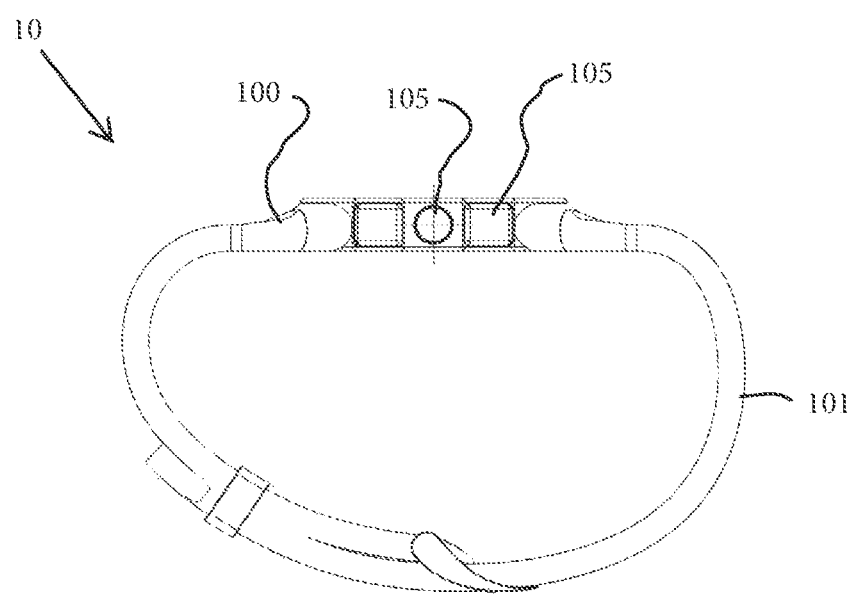
FIG. 2 shows the side of device, according to the present disclosure.
Figure 3:
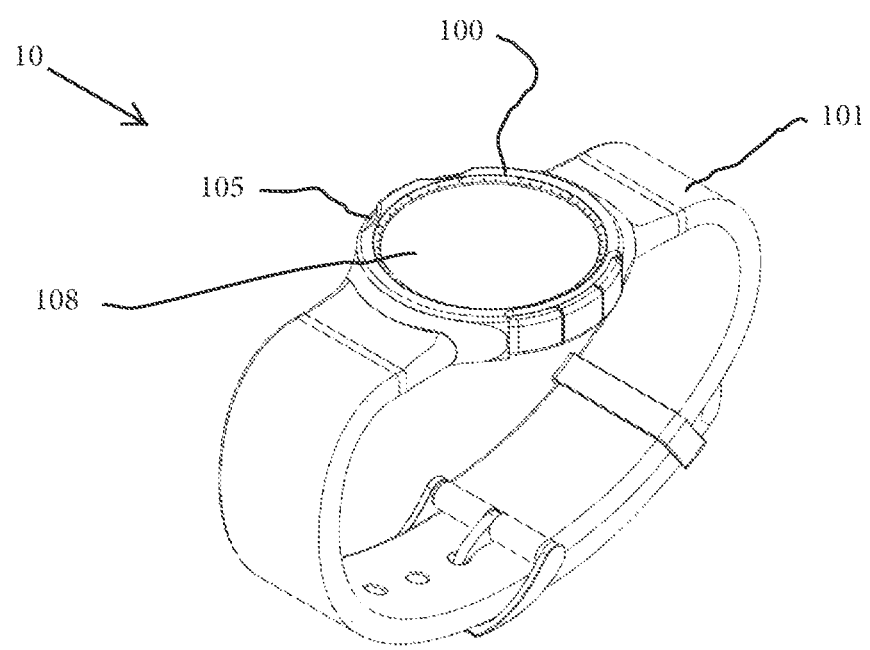
FIG. 3 shows a perspective view of the device, according to the present disclosure.
Figure 4:
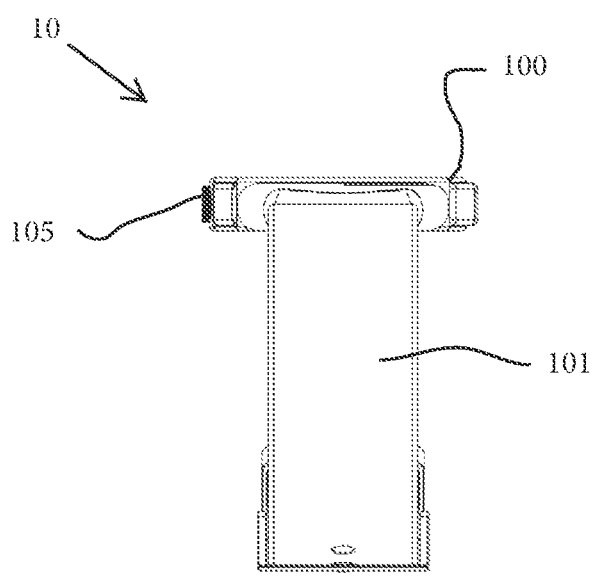
FIG. 4 shows the front of device, according to the present disclosure.
Figure 5:
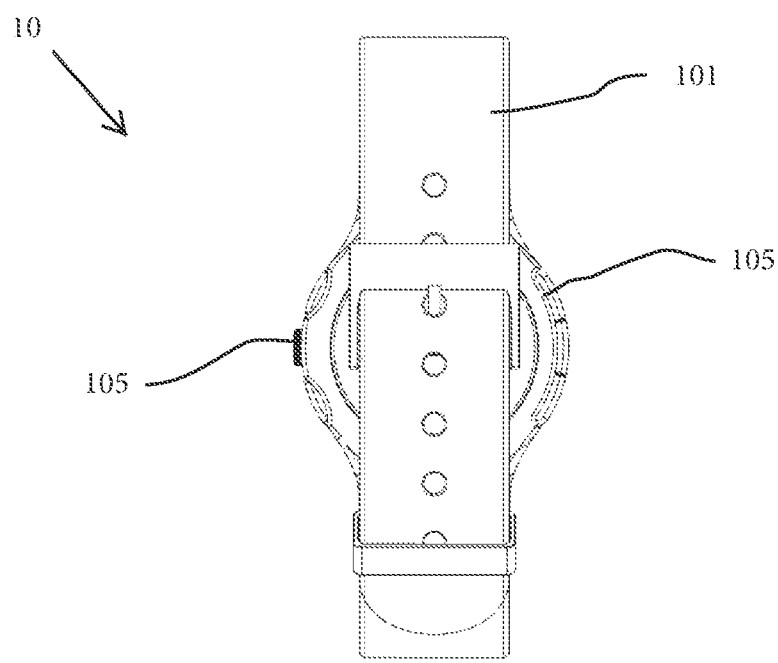
FIG. 5 shows the bottom of device, according to the present disclosure.
Figure 6:
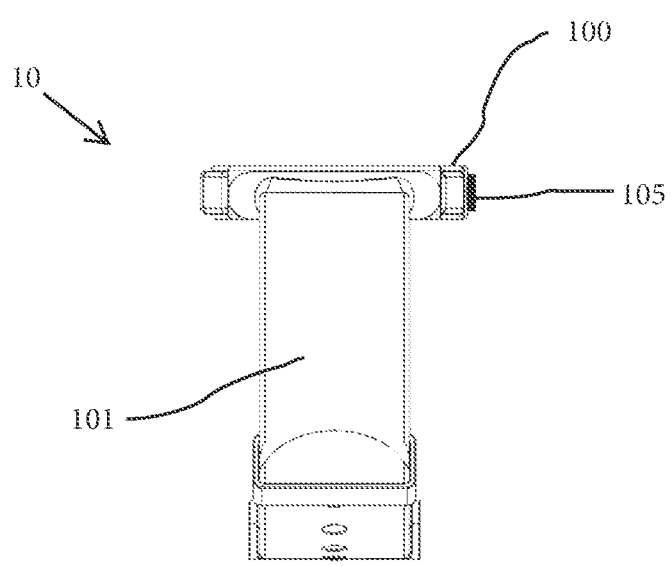
FIG. 6 shows the back of device, according to the present disclosure.
Figure 7:
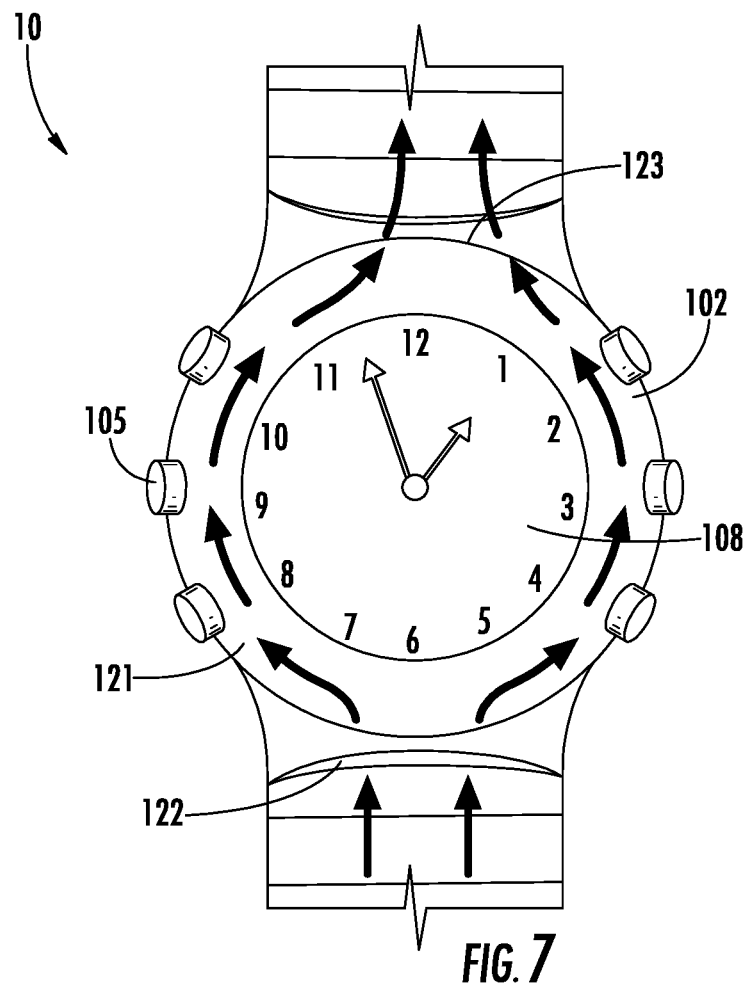
FIG. 7 shows the top view of an embodiment of a bezel of the device, according to the present disclosure.
Figure 8:
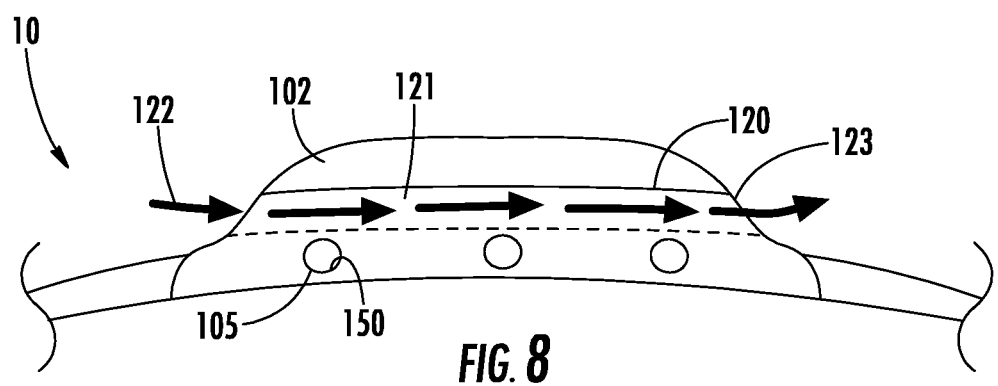
FIG. 8 shows the side view of the embodiment of FIG. 7 of the device, according to the present disclosure.
Figure 9:
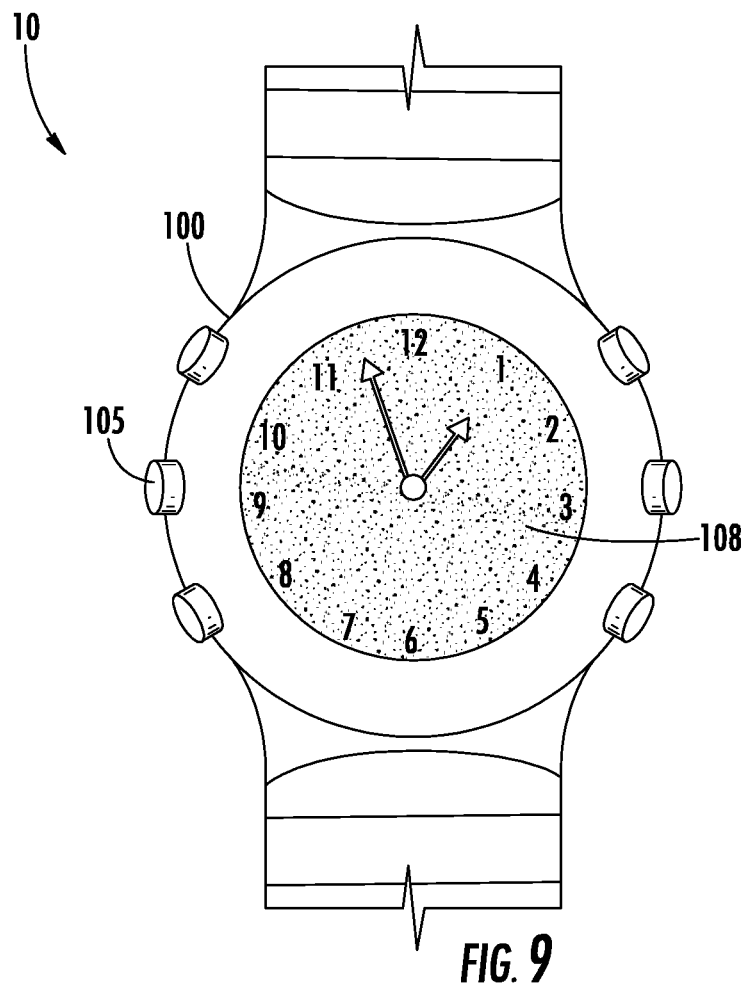
FIG. 9 shows the illumination of an embodiment of the device, according to the present disclosure.
Figure 10:
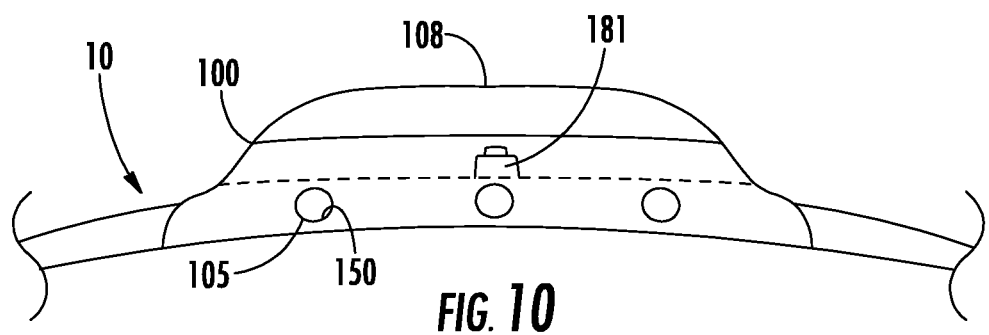
FIG. 10 shows the side view of the embodiment of FIG. 9 of the device, according to the present disclosure.
Figure 11:
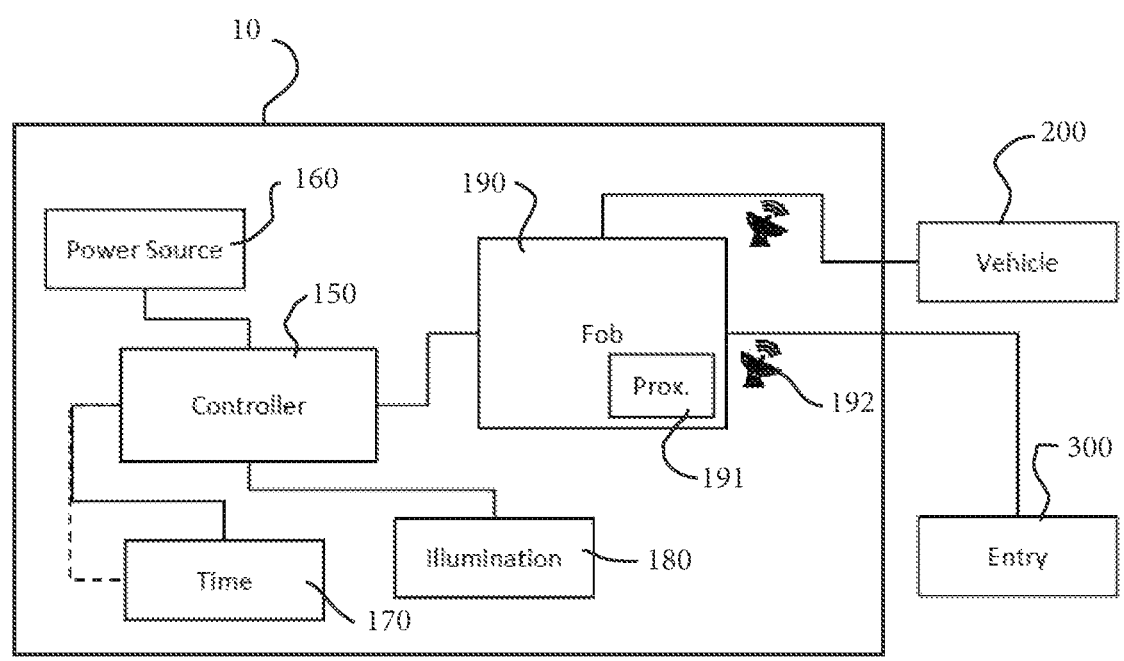
FIG. 11 is a wire frame diagram of the device systems, according to the present disclosure.

Referring to the figures, FIG. 1 to FIG. 11 show the watch device of the present disclosure, generally referred to as device 10. The device 10 configured with a plurality of communicative electronics in remote coupling with additional systems, such as, but not limited to, vehicle systems 200 and entry systems 300. The electric components of the device 10 include a controller 150 configured to generally direct the operation and features of the device 10 and generally process the user commands and actions.

The controller 150 coupled to a power source 160 configured to provide a current to enable operation of the device 10 and coupled components. Preferably the power source 160 is removable. The controller 150 configured to complete processing steps and coupled to at least a time mechanism 170, an illumination system 180, a fob system 190, and at least one sensor 191. The controller 150 and components enclosed within a housing 100 generally sealed from the environment and providing protection.

The housing 100 generally shaped for placement on the wrist of the user though a strap portion 101 and resembling a watch as is known in the art. The housing 100 enclosing a dial portion 108. The dial portion 108 being a generally planar surface configured to visibly display information generated from the time mechanism 170 to the wearer. The time mechanism 170 can be coupled to the controller 150 in the form of a digital display, such as a liquid crystal display (LCD) or provided in a more traditional analog movement utilizing rotating hands and indicators.

The dial portion 108 further coupled to the illumination system 180, wherein the illumination system 180 directs selective illumination of dial portion 108. Accordingly, the dial portion 108 is comprised of a surface and materials configured to generate light. Preferably this dial portion 108 is of the of the electroluminescent type, wherein the dial portion 108, illumination system 180, controller 150, and power source 160 are in an electrical coupling, wherein the generated electrical field or current is converted into light emanating from the dial portion 108.

The illumination system 180 is configured to direct the selective illumination of the dial portion 108 and may be utilized as a security feature. Accordingly, the illumination system 180 may be directed to activate the illumination of the dial portion 108 in a specific pattern upon direction by the user through the depression of the dial portion 108 in communication with an activator 181, a button 105, multiple buttons 105, or a specific sequence of buttons 105. This illumination system 180 pattern may be utilized by the wearer to indicate an emergency condition or to indicate the need for the wearer to be rescued, wherein the dial portion 108 is configured to illuminate in a staccato-like pattern. Preferably, this illumination pattern directed by the illumination system 108 resembles the visual representation of the Morse Code pattern for S.O.S in the form of a sequence of three short flashes followed by three long flashes followed by three short flashes to mimic the dot, dot, dot, dash, dash, dash, dot, dot, dot emergency code sequence.

The illumination system 180 may be alternately or additionally coupled to the button(s) 105 with the buttons having an illumination surface 150, wherein the button 105 illumination surface 150 is illuminated. The illumination system 180 may further direct a specific illumination color, wherein the dial portion 108 and illumination surface 150 are configured to display a given color to indicate with more clarity a given status of the device 10 or coupled system. Accordingly, the illumination system 180 may display alternate colors to indicate a locked or unlocked position of a vehicle or entry way, such as green for unlocked and red for locked.

The fob system 190 of the device 10 is generally configured for remote coupling to vehicle systems 200, wherein the user may activate the button(s) 105 to direct the specific function of a vehicle having a compatible vehicle system 200. The fob system 190 may be configured with, but not limited to, a learning module, a memory, a programming module, a proximity sensor 191, and a transceiver 192 to enable communication with the vehicle systems 200. Accordingly, the user can direct a specific button 105, buttons 105, or button 105 sequence to effectuate a command and response to the coupled vehicle system 200. Therefore, the fob system 190 can be utilized to function as a vehicle fob and key for the operation of the various vehicle systems 200 related to entry and operation, including but not limited to, security systems, windows, door locks, trunk release, ignition systems, and proximity receivers.

In addition to vehicle system capabilities, the fob system 190 of the device 10 can be configured for use with entry systems 300, wherein the existing electronic and sensor components or additional electronic components and sensors are configured to generally interact with security system and/or an entry door. Accordingly, the device 10 fob system may utilize the button(s) 105 to lock or unlock an entry door. Alternately, the fob system 190 may utilize the proximity sensor 191 to automatically lock or unlock a door when the device 10 is moved to a position in proximity to the entry door.

Preferably, the fob system 190 is configured to couple with various smart electronic components to allow for use of the device 10 with an application, software, or program on a personal electronic device, such as a smart phone, that enables additional features of the coupled systems 200, 300.

In an alternate embodiment of the device 10, the housing 100 has an upper surface 102 generally aligned with the dial 108 for visibility by the user during wearing. The upper surface 102 having a bezel 120 surrounding the dial portion 108 of the device 10 generally having a raised structure positioned proud of the upper surface 102. The bezel 120 having a channel 121 functioning as a hollow cavity within an interior of the bezel 120 and having a shape to direct air between a first opening 122 and a second opening 123 for generating a sound. The first opening 122 in pneumatic communication with the channel 121 to provide an inlet allowing the user to direct air, generally through blowing, into the channel 121 directionally towards the second opening 123 where the directed air exits the channel 121. The second opening 123 having a shape selected to cause turbulence of air exiting the second opening 123 with air directed into the channel 121, wherein the turbulence causes a whistle sound to be generated. Accordingly, the user can utilize the device 10 as an emergency whistle to alert others to their presence.

The device 10 is constructed out of resilient materials and assembled to provide a substantially sealed housing 100 to prevent the infiltration of debris and water into the interior of the housing 100 of the device 10 to prevent damage to the internal components. Accordingly, the device 10 construction and assembly may include gasketing members and materials, such as, but not limited to, rubbers and silicones, coupled to the buttons 105 and other movable components to prevent intrusion and allow for proper functioning of the device 10.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A watch configured for remote coupling with an additional system, the watch comprising:
   a controller;
   a fob system, the fob system coupled to the controller and configured for remote communication with the additional system;
   at least one button, the at least one button coupled to the fob system and configured to command the additional system upon activation; and
   a bezel positioned on an upper side of the watch, the bezel having a channel in communication with an opening and configured to direct air within the channel to generate a sound, wherein the bezel functions as a whistle.

2. The watch as in claim 1, wherein the additional system is a vehicle.

3. The watch as in claim 2, wherein activation of the at least one button opens a door of the vehicle.

4. The watch as is claim 2, wherein activation of the at least one button starts the vehicle.

5. The watch as in claim 2, wherein activation of the at least one button, secures the vehicle.

6. The watch as in claim 1, wherein the additional system is an entry door.

7. The watch as in claim 6, wherein the activation of the at least one button secures the entry door.

8. The watch as in claim 6, wherein the activation of the at least one button un-secures the entry door.

9. The watch as in claim 1, wherein the watch additionally comprises:
   a dial portion configured for illumination; and
   an illumination system, the illumination system coupled to the controller and configured to selectively illuminate the dial portion upon activation.

10. The watch as in claim 9, wherein the illumination system illuminates the dial portion in a specific pattern.

11. The watch as in claim 10, wherein the pattern is an SOS pattern, wherein the dial portion is illuminated in a dot, dot, dot, dash, dash, dash, dot, dot, dot pattern.

12. A watch configured for remote coupling with an additional system, the watch comprising:
   a controller;
   a fob system, the fob system coupled to the controller and configured for remote communication with the additional system;
   at least one button, the at least one button coupled to the fob system and configured to command the additional system upon activation;
   a bezel positioned on an upper side of the watch, the bezel having a channel in communication with an opening and configured to direct air within the channel to generate a sound, wherein the bezel functions as a whistle;
   an illuminated dial; and
   an illumination system, the illumination system coupled to the controller and configured to selectively illuminate the dial portion upon activation.

13. The watch as in claim 12, wherein the additional system is a vehicle.

14. The watch as in claim 13, wherein activation of the at least one button opens a door of the vehicle.

15. The watch as is claim 13, wherein activation of the at least one button starts the vehicle.

16. The watch as in claim 13, wherein activation of the at least one button, secures the vehicle.

17. The watch as in claim 12, wherein the additional system is an entry door.

18. The watch as in claim 17, wherein the activation of the at least one button secures the entry door.

19. The watch as in claim 17, wherein the activation of the at least one button un-secures the entry door.

* * * * *